United States Patent
Sambo et al.

(10) Patent No.: US 10,699,137 B2
(45) Date of Patent: Jun. 30, 2020

(54) AUTOMATIC COLLECTION AND CLASSIFICATION OF HARSH DRIVING EVENTS IN DASHCAM VIDEOS

(71) Applicant: Fleetmatics Ireland Limited, Dublin (IE)

(72) Inventors: Francesco Sambo, Florence (IT); Luca Bravi, Scandicci (IT); Samuele Salti, Prato (IT); Leonardo Taccari, Florence (IT); Matteo Simoncini, Pistoia (IT); Alessandro Lori, Florence (IT); Leonardo Sarti, Sesto Fiorentino (IT); Wan Luo, Dublin (IE); Yaoyang Qian, Dublin (IE); Peter Mitchell, Ranelagh (IE); John Molamphy, Wexford (IE)

(73) Assignee: Verizon Connect Ireland Limited, Dublin (IE)

( * ) Notice: Subject to any disclaimer, the term of this patent is extended or adjusted under 35 U.S.C. 154(b) by 147 days.

(21) Appl. No.: 16/103,707

(22) Filed: Aug. 14, 2018

(65) Prior Publication Data
US 2020/0057894 A1    Feb. 20, 2020

(51) Int. Cl.
| G06K 9/00 | (2006.01) |
| G06T 7/20 | (2017.01) |
| G06T 7/536 | (2017.01) |

(52) U.S. Cl.
CPC ........... G06K 9/00805 (2013.01); G06T 7/20 (2013.01); G06T 7/536 (2017.01);
(Continued)

(58) Field of Classification Search
CPC combination set(s) only.
See application file for complete search history.

(56) References Cited

U.S. PATENT DOCUMENTS

| 2011/0133917 A1* | 6/2011 | Zeng | G06K 7/6293 |
|---|---|---|---|
| | | | 340/436 |
| 2011/0140968 A1* | 6/2011 | Bai | G01S 5/0072 |
| | | | 342/454 |

(Continued)

OTHER PUBLICATIONS

Redmon et al., "You Only Look Once: Unified, Real-Time Object Detection", http://pjreddie.com/media/files/papers/yolo.pdf, 2016, 10 pages.

(Continued)

Primary Examiner — Alex Kok S Liew

(57) ABSTRACT

A video classification platform receives a first message that includes a link to video data including video frames captured by one or more cameras associated with the vehicle, and including information concerning a vehicle and a driving event. The platform obtains the video data using the link, identifies the vehicle and the driving event based on the information, and determines objects in a video frame. The platform constructs a collision cone of the vehicle for the video frame and determines, based on the collision cone, a set of objects that have a potential to collide with the vehicle. The platform assigns a category to the driving event based on the set of objects, the collision cone of the vehicle, and the information, generates a second message that includes the category and the information, and sends the second message to a client device to display the second message.

20 Claims, 10 Drawing Sheets

(52) U.S. Cl.
CPC ............. *G06T 2207/20081* (2013.01); *G06T 2207/30241* (2013.01); *G06T 2207/30252* (2013.01)

(56) References Cited

U.S. PATENT DOCUMENTS

| | | | | |
|---|---|---|---|---|
| 2011/0196568 A1* | 8/2011 | Nickolaou | ........ | B60W 50/0098 |
| | | | | 701/31.4 |
| 2012/0081542 A1* | 4/2012 | Suk | ........................ | H04N 7/181 |
| | | | | 348/139 |

OTHER PUBLICATIONS

Farnebäck et al., "Two-frame motion estimation based on polynomial expansion", http://www.diva-portal.org/smash/get/diva2:273847/FULLTEXT01.pdf, 2003, 8 pages.

Fischler et al., "Random sample consensus: a paradigm for model fitting with applications to image analysis and automated cartography," http://www.sri.com/sites/default/files/publications/ransac-publication.pdf, 1981, 15 pages.

* cited by examiner

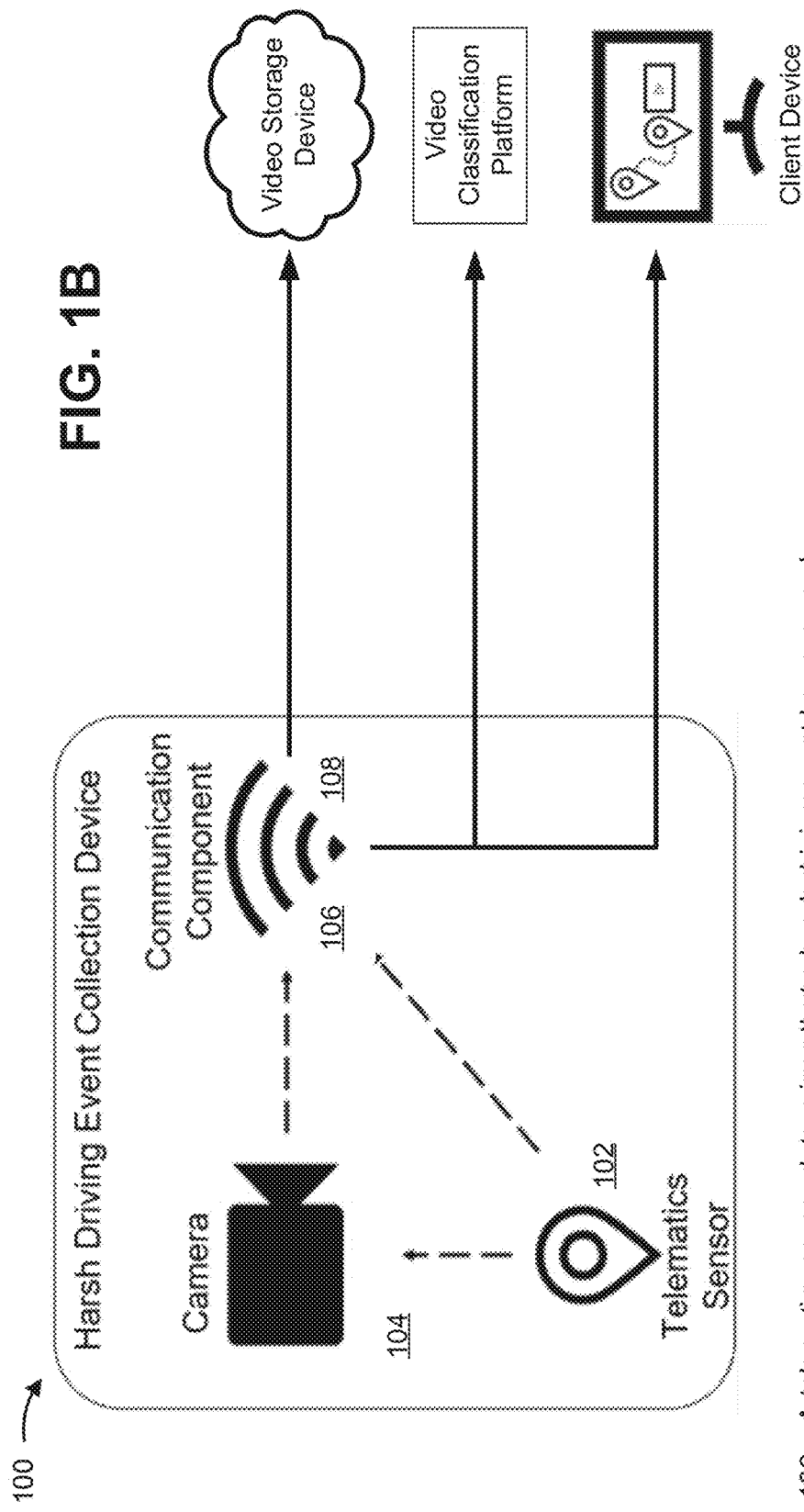

AUTOMATIC COLLECTION AND CLASSIFICATION OF HARSH DRIVING EVENTS IN DASHCAM VIDEOS

BACKGROUND

A dashboard camera can be mounted to a vehicle to capture video data related to the vehicle, a road the vehicle is traveling on, a path of the vehicle on the road, one or more objects on the road and/or in the path of the vehicle, and/or the like.

BRIEF DESCRIPTION OF THE DRAWINGS

FIGS. 1A-1G are diagrams of example implementations described herein.

DETAILED DESCRIPTION OF PREFERRED EMBODIMENTS

Figure 1A:
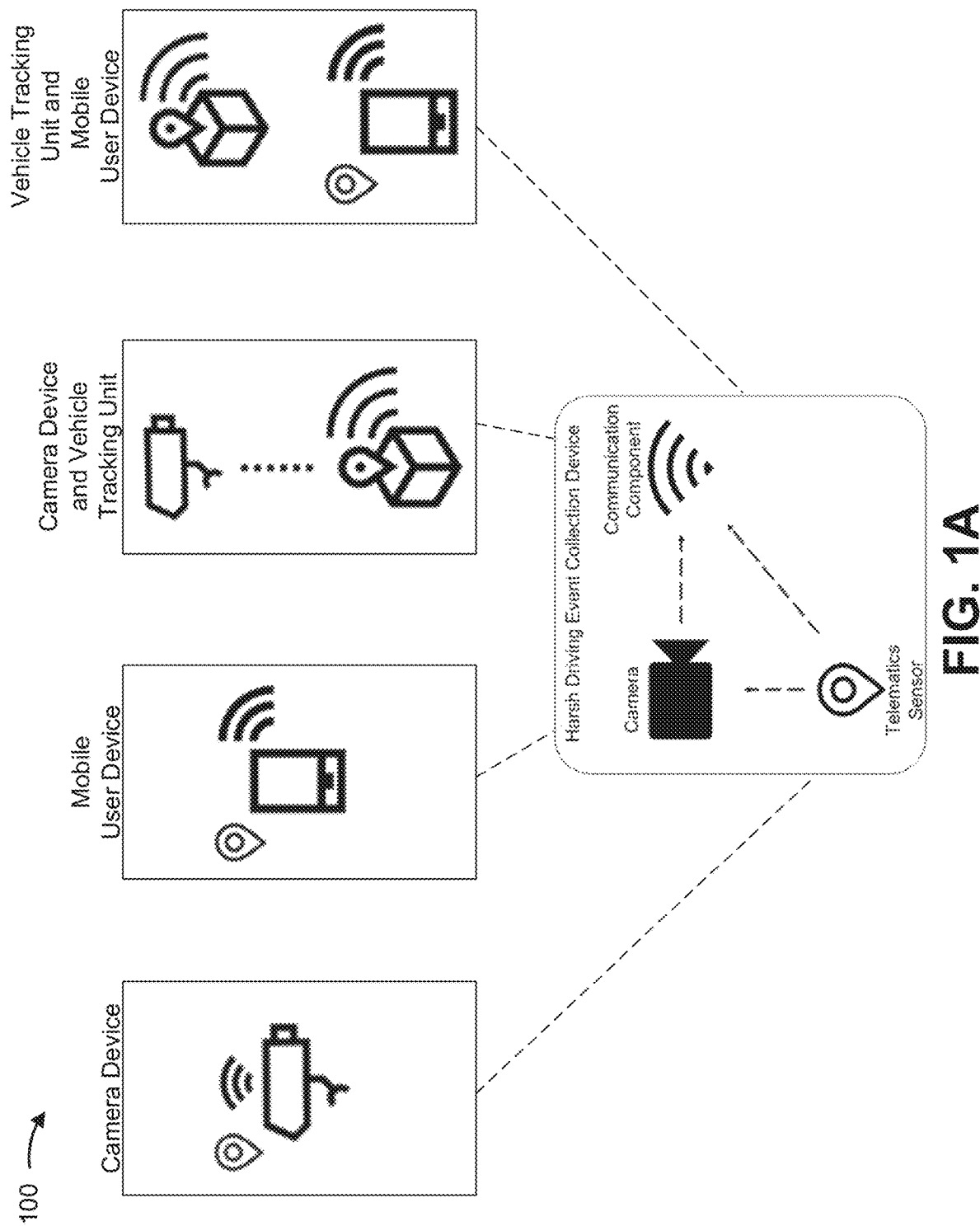

The following detailed description of example implementations refers to the accompanying drawings. The same reference numbers in different drawings can identify the same or similar elements.

While driving a vehicle, a driver can experience a harsh driving event, such as a harsh braking event, a quick start event, a cornering event, a crash event, an off-road event, and/or the like. In some circumstances, the harsh driving event can create a dangerous situation for the driver, the vehicle, and/or other people and property. However, the driver might not be aware that he is exhibiting harsh driving behavior that can lead to a harsh driving event. Moreover, fleet managers who employ numerous drivers might not know whether the drivers exhibit harsh driving behavior and/or create harsh driving events.

Some implementations, described herein, provide a harsh driving event collection device that is capable of collecting video data concerning a harsh driving event and a video classification platform that is capable of classifying the harsh driving event by processing the video data concerning the harsh driving event. In some implementations, the harsh driving event collection device can include a camera that stores video data files in a circular buffer, such that the camera can collect video data for a period of time concerning the harsh driving event that includes a first interval of time before the harsh driving event and a second interval of time after the harsh driving event. In some implementations, the harsh driving event collection device can collect data concerning acceleration/deceleration of a vehicle and data concerning a position of the vehicle. In some implementations, the video classification platform can process the video data, the data concerning acceleration/deceleration of the vehicle, and the data concerning the position of the vehicle to determine features of the harsh driving event. In some implementations, the video classification platform can assign a category to the harsh driving event based on the features. In some implementations, the video classification platform can send a message to a client device so that the client device can display information concerning the harsh driving event, the category, the video data, the data concerning acceleration/deceleration of the vehicle, and the data concerning the position of the vehicle.

In this way, implementations described herein can alert fleet managers and/or drivers of harsh driving events and/or provide tools for reviewing harsh driving events after the harsh driving events happen. In this way, implementations described herein provide drivers with information that can be used to change the driving behavior of the drivers. Similarly, implementations described herein can allow the fleet managers to create safe driving training materials and/or guidelines, which can prevent or reduce the quantity of harsh driving events in the future. This can result in the increased safety of the drivers, the vehicles that the drivers operate, and other people and property. This can also result in less wear-and-tear on the vehicles or vehicle components, which can reduce costs associated with maintaining the vehicles.

Furthermore, implementations described herein are automated and can capture and process numerous (e.g., hundreds, thousands, millions, billions, and/or the like) data points to classify numerous harsh driving events at the same time. This can improve speed and efficiency of the process and conserve computing resources (e.g., processor resources, memory resources, and/or the like) of the harsh driving event collection device, the video classification platform, and/or the client device. Furthermore, implementations described herein use a rigorous, computerized process to perform tasks or roles that were not previously performed or were previously performed using subjective human intuition or input. For example, currently there does not exist a technique to automatically collect information concerning a harsh driving event and/or process the information concerning the harsh driving event to classify the harsh driving event. Finally, implementations described herein conserve computing resources (e.g., processor resources, memory resources, and/or the like) that would otherwise be wasted in attempting to assist a human in collecting information concerning a harsh driving event and/or classifying the harsh driving event by hand.

FIGS. 1A-1G are diagrams of example implementations 100 described herein. As shown in FIG. 1A, example implementation 100 can include a harsh driving event collection device that can be used by a vehicle. In some implementations, the harsh driving event collection device can include a camera device, a mobile user device, a vehicle tracking unit device, and/or a similar device that is capable of capturing data concerning a harsh driving event. In some implementations, the harsh driving event collection device can determine that a harsh driving event concerning the vehicle has occurred and collect video data concerning the harsh driving event.

In some implementations, the harsh driving event collection device can be mounted and/or affixed to the vehicle (e.g., on a dashboard of the vehicle, on a windshield of the vehicle, and/or the like). In some implementations, the harsh driving collection device can include a camera (e.g., a dashboard camera, sometimes referred to as a "dash cam," a video camera, and/or the like). In some implementations, the harsh driving event collection device can be mounted and/or affixed to the vehicle such that the camera is pointed in a direction that the vehicle is traveling. In some implementations, the camera can capture video data (e.g., record the video data and store the video data) concerning the vehicle, the trajectory of the vehicle, a road that the vehicle is traveling on, one or more objects on and/or near the road (e.g., other vehicles, sign posts, guard rails, road debris, people, animals, and/or the like), and/or the like. In some implementations, the video data comprises a plurality of video frames, where one video frame comprises video data information for a specific moment in time. In some implementations, the video data has a frame rate (e.g., a quantity of video frames per second). In some implementations, the harsh driving event collection device can include one or more cameras that are front-facing (e.g., pointed to the front of the vehicle), rear-facing (e.g., pointed to the back of the vehicle), and/or side-facing (e.g., pointed to the side of the vehicle), and/or the like.

In some implementations, the harsh driving event collection device can include a telematics sensor. In some implementations, the telematics sensor includes an accelerometer that collects data concerning acceleration and/or deceleration (hereinafter referred to generally as acceleration/deceleration) of the vehicle. For example, the data concerning acceleration/deceleration of the vehicle can include information concerning an acceleration/deceleration rate of the vehicle, an acceleration/deceleration direction of the vehicle, a maximum acceleration/deceleration rate of the vehicle during a period of time, a start time of the period of time, an end time of the period of time, a speed of the vehicle at the start time, a speed of the vehicle at the end time, and/or the like.

In some implementations, the telematics sensor of the harsh driving event collection device can include a global positioning system (GPS) sensor that collects data concerning a position of the vehicle. For example, the data concerning the position of the vehicle can include a location of the vehicle (e.g., represented as a latitude and longitude pair), a time of the location of the vehicle (e.g., when the vehicle is at the location), a direction of the vehicle (e.g., which way the vehicle is pointing, such as in degrees away from north, where north is represented by 0 degrees), a distance from a last recorded location of the vehicle, and/or the like.

In some implementations, the harsh driving event collection device can include a communication component. In some implementations, the communication component can facilitate communication between the harsh driving event collection device and one or more other devices. In some implementations, the communication component can communicate with the one or more other devices using a wired connection, a wireless connection, or a combination of wired and wireless connections. In some implementations, the communication component can transmit the video data, the data concerning the acceleration/deceleration of the vehicle, the data concerning the position of the vehicle, and/or the like to the one or more other devices.

As an example, as shown in FIG. 1A, the vehicle can use a camera device, such as a smart dashboard camera, as the harsh driving event collection device, where the camera device includes the camera, the telematics sensor, which includes the accelerometer and the GPS sensor, and the communication component. As another example, the vehicle can use a mobile user device, such as a cellular phone, as the harsh driving event collection device, where the mobile user device includes the camera, the telematics sensor, which includes the accelerometer and the GPS sensor, and the communication component.

In a further example, as shown in FIG. 1A, the harsh driving event collection device of the vehicle can comprise a camera device, such as a basic dashboard camera, and a vehicle tracking unit device, where the camera device includes the camera and the vehicle tracking unit device includes the telematics sensor, which includes the accelerometer and the GPS sensor, and the communication component. In some implementations, the vehicle tracking unit device is an internal component of the vehicle. In some implementations, the camera device and the vehicle tracking unit device can communicate with each other to share information (e.g., by a wireless and/or wired connection).

In an additional example, the harsh driving event collection device of the vehicle can comprise a vehicle tracking unit device and a mobile user device. In some implementations, the vehicle tracking unit device can include the GPS sensor and a first communication component and the mobile user device can include the camera, the accelerometer, and a second communication component. In some implementations, the vehicle tracking unit device cannot directly communicate with the mobile user device, so the vehicle tracking unit device and the mobile user device can transmit, respectively, data to the one or more other devices via the first communication component of the vehicle tracking unit device and the second communication component of the mobile user device.

As shown in FIG. 1B, the harsh driving event collection device can send information concerning a harsh driving event to the one or more other devices, such as a video storage device, a video classification platform, and/or a client device. In some implementations, the information comprises the video data, the data concerning the acceleration/deceleration of the vehicle, and/or the data concerning the position of the vehicle. In some implementations, the video data, the data concerning the acceleration/deceleration of the vehicle, and/or the data concerning the position of the vehicle can be related to a harsh driving event, such as a harsh braking event, a quick start event, a cornering event, a crash event, an off-road event, and/or the like.

As shown by reference number 102, the telematics sensor, which includes the accelerometer and the GPS sensor, of the harsh driving event collection device can determine that a harsh driving event has occurred. In some implementations, the telematics sensor can process the data concerning the acceleration/deceleration of the vehicle (e.g., a rapid increase in the acceleration rate of the vehicle, a rapid decrease in the acceleration rate of the vehicle, the acceleration rate of the vehicle satisfies a threshold, the acceleration direction of the vehicle suddenly changes, and/or the like) to determine that the harsh driving event has occurred. For example, the telematics sensor can detect, via the accelerometer, a sudden decrease in the acceleration rate of the vehicle (e.g., the acceleration rate of the vehicle decreases by more than a threshold amount during an amount of time) and determine that a harsh driving event (e.g., a hard braking event) has occurred. In some implementations, the telematics sensor, after determining that the harsh driving event has occurred, can send a signal to the camera of the harsh driving event collection device to collect video data regarding the harsh driving event.

As shown by reference number 104, the camera, which continuously captures video data (e.g., records the video data and caches the video data), can collect the video data regarding the harsh driving event after receiving the signal (e.g., keep the video data that the camera has captured related to the harsh driving event). In some implementations, the signal indicates a start time of the harsh driving event. In some implementations, the camera can collect the video data related to a period of time that concerns the harsh driving event. For example, the camera can collect the video data relating to a first interval of time before the start time of the harsh driving event (e.g., 15 seconds before the start time of the harsh driving event) and a second interval of time after the start time of the harsh driving event (e.g., 5 seconds after the start time of the harsh driving event) by retrieving the video data captured by the camera for the first interval of time and the second interval of time. In this way, the camera can collect the video data for the period of time (e.g., 20 seconds) that shows what happened prior to the harsh driving event and after the harsh driving event. Further description regarding how the camera captures, stores, and collects the video data is provided below.

As shown by reference number 106, the camera can send the video data to the communication component. In some implementations, the telematics sensor can send the data concerning acceleration/deceleration of the vehicle and/or the data concerning the position of the vehicle to the communication component. As shown by reference number 108, the communication component can send the video data, the data concerning the acceleration/deceleration of the vehicle, the data concerning the position of the vehicle, and/or the like to the video storage device, the video classification platform, and/or to the client device.

Figure 1C:
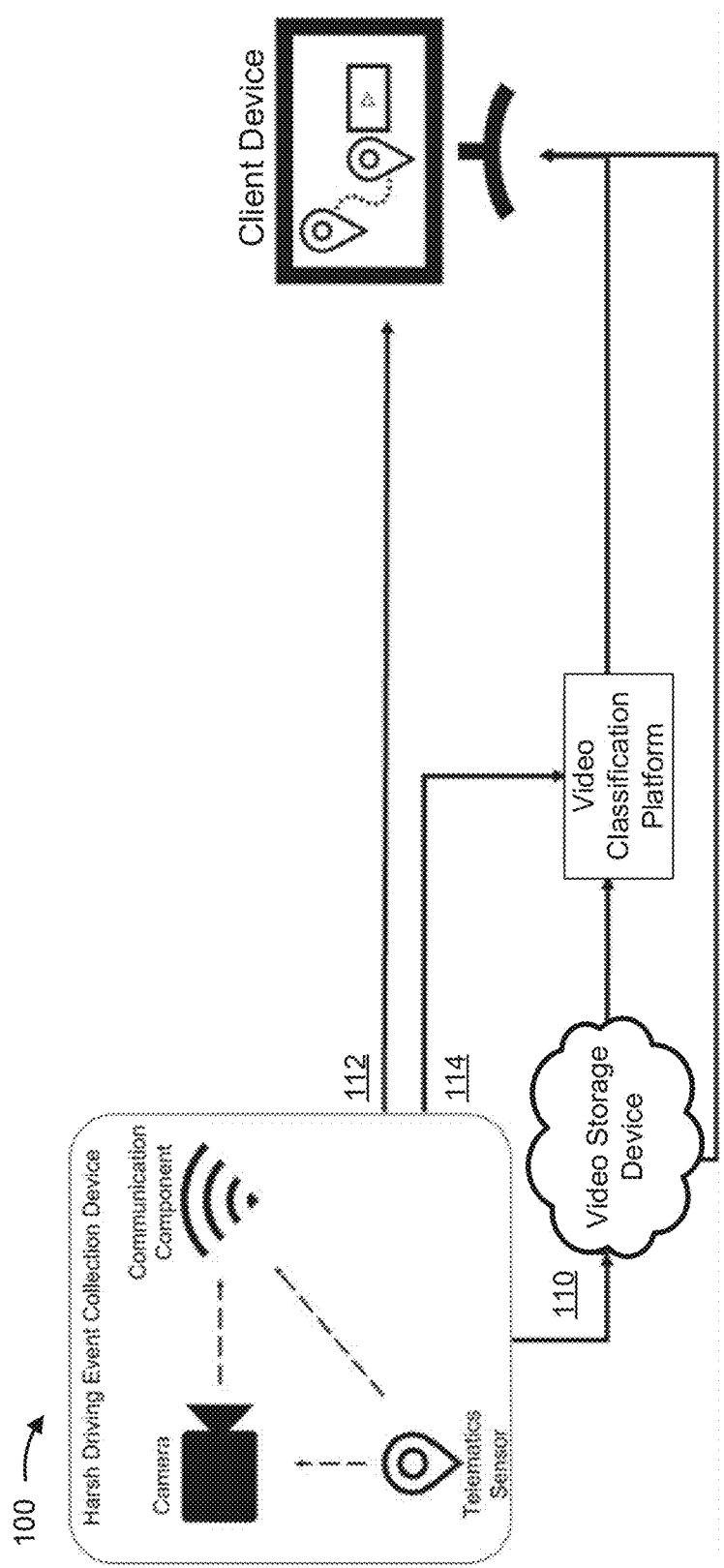

As shown in FIG. 1C and by reference number 110, the communication component of the harsh driving event collection device can send the video data to the video storage device. In some implementations, the video storage device can store the video data and host the video data for download by the video classification platform and/or the client device.

As shown by reference number 112, the communication component of the harsh driving event collection device can send the data concerning the acceleration/deceleration of the vehicle and/or the data concerning the position of the vehicle to the client device. In some implementations, the client device can track the acceleration/deceleration of the vehicle and/or the position of the vehicle in real time based on receiving the data concerning the acceleration/deceleration of the vehicle and/or the data concerning the position of the vehicle.

As shown by reference number 114, the communication component can generate and send a message to the video classification platform. In some implementations, the message includes the video data, the data concerning the acceleration/deceleration of the vehicle, the data concerning the position of the vehicle, and/or the like. In some implementations, the message can include a link to the video data, the data concerning the acceleration/deceleration of the vehicle, the data concerning the position of the vehicle, and/or the like. For example, the communication component can generate a message that includes the data concerning the acceleration/deceleration of the vehicle, the data concerning the position of the vehicle, and a link (e.g., a uniform resource link (URL)) to the video data. In some implementations, the message can include the data concerning the acceleration/deceleration of the vehicle for the period of time associated with the video data, the data concerning the position of the vehicle for the period of time associated with the video data, and the link to the video data.

Figure 1D:
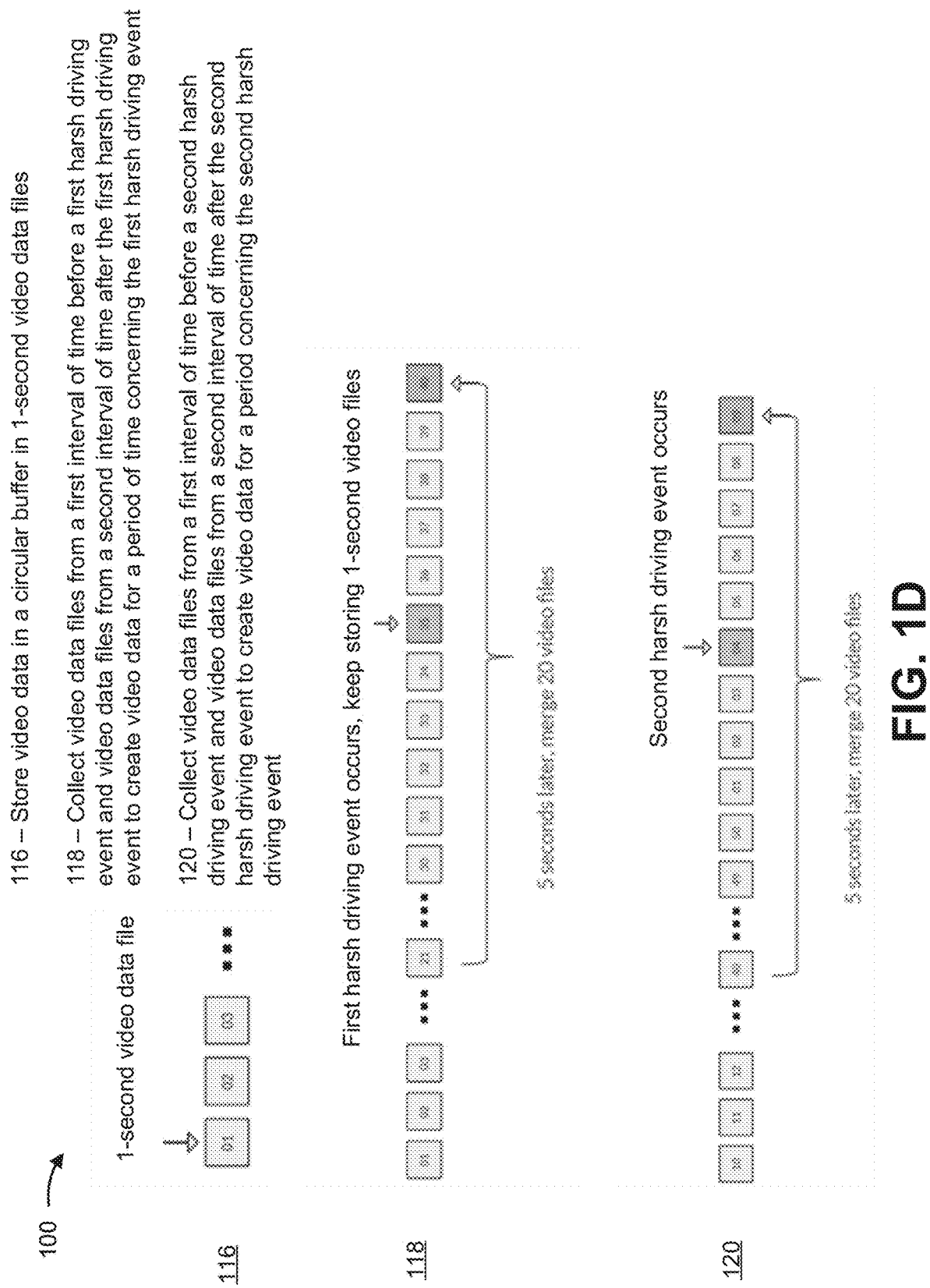

As shown in FIG. 1D, the camera of the harsh driving event collection device can capture and store video data in a memory of the camera. In some implementations, the memory can be a circular buffer. In some implementations, the camera of the harsh driving event collection device can continuously capture video data and cache the video data in the circular buffer.

FIG. 1D shows an example circular buffer of the camera, where the circular buffer can store up to 50 seconds of video data. In some implementations, the circular buffer can be configured to store video data for a larger period of time (e.g., greater than 50 seconds of video data). In some implementations, the circular buffer can be configured to store video data for a shorter period of time (e.g., less than 50 seconds of video data). In some implementations, the circular buffer can be configured to be large enough to capture video data for at least the period of time concerning the harsh driving event.

As shown in FIG. 1D and by reference number 116, the camera, which continuously captures video data, can capture the video data in one-second increments and store the video data as one-second video files in the circular buffer. The circular buffer can store up to 50 one-second video files because the circular buffer has a 50-second capacity. Once the 50-second capacity is reached, the circular buffer can overwrite the oldest one-second video file in the circular buffer with a new one-second video file.

In some implementations, based on receiving the signal from the telematics sensor that indicates the start time of the harsh driving event and because the camera continuously caches the video data in the circular buffer, the camera can collect the video data for the period of time concerning the harsh driving event (e.g., keep the video data that the camera has captured and cached in the circular buffer related to the harsh driving event). For example, the camera can collect the video data from the buffer that represents the first interval of time (e.g., 15 seconds, 30 seconds, 1 minute, and/or the like before the start time of the harsh driving event) and the second interval of time (e.g., 5 seconds, 10 seconds, 30 seconds, 1 minute, and/or the like after the start time of the harsh driving event). In some implementations, the camera can join the video data for the first interval of time and the video data for the second interval of time to collect the video data for the period of time regarding the harsh driving event. For example, as shown by reference number 118, the signal can indicate the start time of the harsh driving event as corresponding to the $35^{th}$ one-second video file in the circular buffer. The camera can retrieve the $21^{st}$ to $35^{th}$ one-second video files to collect the video data for the first interval of time (e.g., 15 seconds before the start time of the harsh driving event) and can retrieve the $36^{th}$ to $40^{th}$ one-second video files to collect the video data for the second interval of time (e.g., 5 seconds after the start time of the harsh driving event). In this way, the collected video data for the period of time regarding the harsh driving event can provide context regarding the harsh driving event to a viewer of the video data, such as a behavior of a driver of the vehicle that led to the harsh driving event, driving conditions for the vehicle before and after the harsh driving event, an action that the driver took after the harsh driving event, and/or the like. In some implementations, the camera can capture video data and store one-second video files in the circular buffer while the camera collects the video data related to the harsh driving event.

In some implementations, due to the characteristics of the circular buffer, the camera can collect video data from the circular buffer for the period of time concerning the harsh driving event (e.g., the 20 seconds encompassing the 15 seconds before the start time of the harsh driving event and the 5 seconds after the start time of the harsh driving event) even if the period of time overlaps with a period of time concerning a prior harsh driving event. For example, as shown by reference number 120, the period of time concerning the harsh driving event corresponds with the $40^{th}$ to 9th one-second video files of the circular buffer and the period of time concerning the prior harsh driving event, as shown by reference number 118, corresponds to the $21^{st}$ to $40^{th}$ one-second video files of the circular buffer. The $40^{th}$ one-second video file can be used for the video data corresponding to the harsh driving event and the video data corresponding to the prior harsh driving event.

In some implementations, each video frame of the video data can be captured and stored in one-frame sized video files. For example, where the circular buffer contains up to 50 seconds of video data, the circular buffer can store up to 50 times the frame rate of the video data in one-frame sized video files. In some implementations, the circular buffer can be large enough to capture video data for at least the period of time concerning the harsh driving event in one-frame sized video files.

Figure 1E:
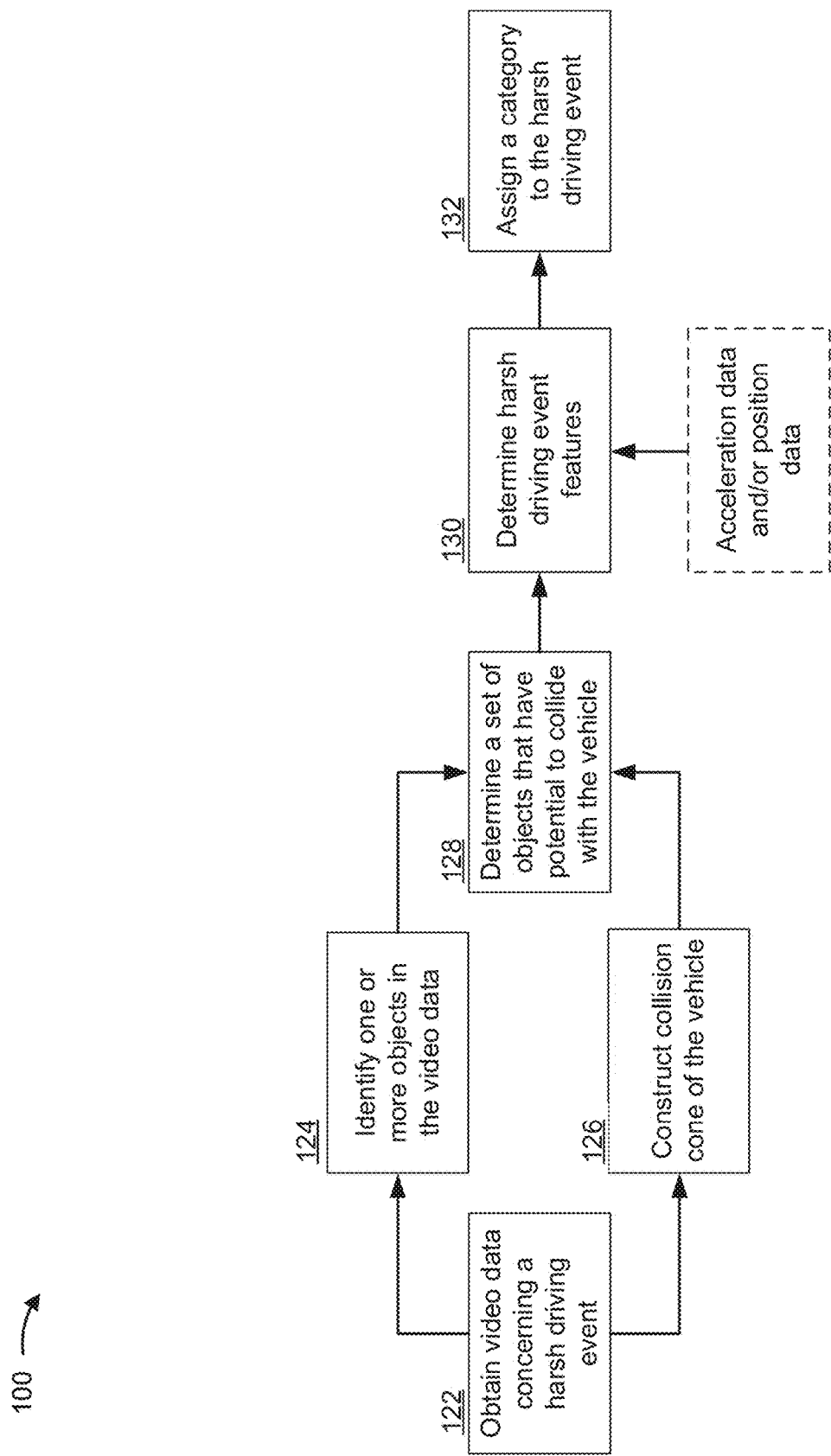

As shown in FIG. 1E, the video classification platform classifies the harsh driving event based on the video data concerning the harsh driving event, the data concerning the acceleration/deceleration of the vehicle, the data concerning the position of the vehicle, and/or the like. As shown by reference number 122, the video classification platform can obtain the video data from the harsh driving event collection device and/or the video storage device. In some implementations, the video classification platform can receive a message from the harsh driving event collection device. In some implementations, the message can include a link (e.g., a uniform resource link (URL)) to the video data stored at the video storage device. In some implementations, the video classification platform can download the video data via the link from the video storage device. In some implementations, the message can include the data concerning acceleration/deceleration of the vehicle and/or the data concerning the position of the vehicle. In some implementations, the video classification platform can identify the vehicle and the harsh driving event based on the data concerning acceleration/deceleration of the vehicle and/or the data concerning the position of the vehicle.

In some implementations, the video classification platform can obtain the video data from the harsh driving event collection device and/or the video storage device without having to download the video data via a link from the video storage device. For example, the harsh driving event collection device and/or the video storage device can send the video data to the video classification platform (e.g., push the video data to the video classification platform) without the video classification platform having to request the video data.

In some implementations, the video classification platform can process the video data, the data concerning the acceleration/deceleration of the vehicle, the data concerning the position of the vehicle, and/or the like to classify the harsh driving event. In some implementations, the video classification platform can use a classification pipeline to process the video data, the data concerning the acceleration/deceleration of the vehicle, the data concerning the position of the vehicle, and/or the like to classify the harsh driving event.

In some implementations, the video classification platform can use the classification pipeline to process each video frame of the plurality of video frames that comprise the video data to classify the harsh driving event. In some implementations, the video classification platform can use the classification pipeline to process a set of video frames of the plurality of video frames to classify the harsh driving event, wherein the set of the plurality of video frames includes fewer than all the plurality of video frames. In some implementations, processing the set of video frames can minimize the use of processing resources and memory resources of the video classification platform that would otherwise be used to process each video frame of all of the plurality of video frames.

In some implementations, the classification pipeline can include multiple phases to classify the harsh driving event. In a first phase, as shown by reference number 124, the video classification platform can process a video frame to identify one or more objects. In some implementations, the video classification platform can use an object detection algorithm to identify the one or more objects in the video frame. For example, the video classification platform can process the video frame using a convolutional neural network to determine the one or more objects. In some implementations, the video classification platform can classify the one or more objects, respectively, into an object category, such as a vehicle, a car, a truck, a person, a motorcycle, a bike, a motorbike, an animal, a street sign, a stop sign, a traffic light, and/or the like.

In a second phase of the classification pipeline, as shown by reference number 126, the video classification platform can construct a collision cone of the vehicle for the video frame. In some implementations, the collision cone can be the area of the video frame that represents the path the vehicle will travel given the vehicle's trajectory in the video frame. In some implementations, the video classification platform can construct the collision cone of the vehicle for the video frame by computing an optical flow of the video frame and determining a vanishing point of the video frame. In some implementations, the video classification platform can use an optical flow algorithm to compute the optical flow of the video frame. For example, the video classification platform can process the video frame using Farneback's algorithm to compute the optical flow of the video frame. In some implementations, the video classification platform can use a vanishing point algorithm to determine the vanishing point of the video frame. For example, the video classification platform can process the video frame using a random sample consensus (RANSAC) algorithm to determine the vanishing point of the video frame.

In a third phase of the classification pipeline, as shown by reference number 128, the video classification platform can determine a set of objects of the one or more objects in the video frame that have a potential to collide with the vehicle. In some implementations, the video classification platform can determine the set of objects of the one or more objects in the video frame that have the potential to collide with the vehicle based on determining motion of the one or more objects and calculating a time to collision of the one or more objects. In some implementations, the video classification platform can determine the motion of the one or more objects based on the optical flow of the video frame. In some implementations, the video classification platform can calculate the time to collision of the one or more objects by comparing the motion of the one or more objects and the collision cone of the vehicle.

In a fourth phase of the classification pipeline, as shown by reference number 130, the video classification platform can determine one or more features concerning the harsh driving event based on the video data, such as the set of objects, the collision cone, and the one or more objects, the data concerning acceleration/deceleration of the vehicle, and/or the data concerning the position of the vehicle. For example, the harsh driving event classification algorithm can determine, for the period of time associated with the harsh driving event, a minimum estimated amount of time for the set of objects to collide with the vehicle, an average estimated amount of time for the set of objects to collide with the vehicle, a median estimated amount of time for the set of objects to collide with the vehicle, a maximum estimated amount of time for the set of objects to collide with the vehicle, or a standard deviation of the estimated amount of time for the set of objects to collide with the vehicle. As another example, the harsh driving event classification algorithm can determine, for the period of time associated with the harsh driving event, a sum of distinct objects detected by the video classification platform, a sum of distinct objects for each object category detected by the video classification platform, and/or a maximum area of the distinct objects appearing in the plurality of video frames. In a further example, the video classification platform can determine values associated with the optical flows of the plurality of video frames, such as a maximum value of the optical flows, a minimum average of the optical flows, and/or a standard deviation of values associated with the optical flows. Moreover, the harsh driving event classification algorithm can determine the values associated with the optical flow for one or more video frames of the plurality of video frames and/or a plurality of quadrants of the one or more video frames (e.g., nine quadrants defined by dividing a video frame of the one or more video frames into thirds along the horizontal and vertical axes of the video frame) of the plurality of video frames.

In a fifth phase of the classification pipeline, as shown by reference number 132, the video classification platform can assign a category to the harsh driving event. In some implementations, the category can indicate a dangerous harsh driving event and/or a non-dangerous harsh driving event. In some implementations, the category can indicate that the harsh driving event is a crash event, a near-crash event, a non-dangerous event, a dangerous event, and/or the like. In some implementations, the category can indicate a duration of the harsh driving event, an acceleration or deceleration rate of the vehicle, a speed of the vehicle, a trigger of the driving event, and/or the like.

In some implementations, the video classification platform can assign the category to the harsh driving event based on the set of objects, the collision cone, the one or more objects, the data concerning acceleration/deceleration of the vehicle, and/or the data concerning the position of the vehicle. In some implementations, the video classification platform can assign the category to the harsh driving event based on the one or more features concerning the harsh driving event. In some implementations, the video classification platform can use a harsh driving event classification algorithm to assign the category to the harsh driving event. In some implementations, the harsh driving event classification algorithm can be a machine learning algorithm. In some implementations, the video classification platform can use the harsh driving event classification platform to process the set of objects, the collision cone, the one or more objects, the data concerning acceleration/deceleration of the vehicle, the data concerning the position of the vehicle, and/or the one or more features concerning the harsh driving event to assign the category to the harsh driving event.

In some implementations, the video classification platform can utilize a machine learning or artificial intelligence model to assign the category to the harsh driving event. For example, based on the model, the video classification platform can assign a respective weight to the one or more features concerning the harsh driving event to assign the category to the harsh driving event. In this way, the video classification platform can assign the category to the harsh driving event in a manner that optimizes the processing resources of the video classification platform.

In some implementations, the video classification platform can train the model based on an artificial intelligence approach, such as a machine learning algorithm, a neural network algorithm, or another type of artificial intelligence approach. To train the model based on the artificial intelligence approach, the video classification platform can use a training set of known inputs (e.g., inputs concerning one or more features concerning a harsh driving event) and known outputs corresponding to the inputs (e.g., outputs concerning a category for a harsh driving event). For example, the video classification platform can train the model based on a training set of data that includes an input group (e.g., past inputs relating to one or more features concerning a harsh driving event) and an output group (e.g., past outputs relating to a category for a harsh driving event), where each input group corresponds to an optimal output group, such as an optimal assignment of a category to a harsh driving event. In some implementations, another device can train the model and provide the model for use by the video classification platform.

In some implementations, the artificial intelligence approach can identify relationships between the known inputs and the known outputs, and can configure parameters corresponding to the relationships. For example, the model can process the training set of data and create general rules for assigning a category to a harsh driving event based on one or more features concerning a harsh driving event. In some implementations, the model can be used to generate a score that indicates the likelihood that a harsh driving event belongs to a category.

In some implementations, the video classification platform can update the model based on the artificial intelligence approach. For example, the video classification platform can use a testing set of known inputs (e.g., inputs concerning one or more features concerning a harsh driving event) and target outputs corresponding to the known outputs (e.g., outputs concerning a category for a harsh driving event). The target outputs can be outputs that are known to be optimal. The video classification platform can input, to the model, the known inputs of the testing set, and the model can output observed outputs. The video classification platform can compare the target outputs and the observed outputs, and can reconfigure the parameters of the model based on the artificial intelligence algorithm. In this way, the video classification platform can improve accuracy of the model based on iteratively improving accuracy of parameters of the model.

In some implementations, the video classification platform can use the trained and updated model to assign a category to the driving event. For example, the video classification platform can specify one or more features concerning a harsh driving event as inputs to the model. The model can then output information assigning a category to the driving event, possibly with a corresponding score that indicates the likelihood that the harsh driving event belongs to the category.

In this way, the video classification platform can deliver an optimized process for assigning a category to the harsh driving event in a manner that conserves computing resources (e.g., processor resources, memory resources, and/or the like), which would otherwise be wasted performing an inefficient and/or time-consuming process.

In some implementations, the video classification platform can generate a message that includes the category. For example, the video classification platform can generate a message that includes the category that indicates that the harsh driving event is a non-dangerous event or a dangerous event. In some implementations, the message can include the category, the video data, the data concerning the acceleration/deceleration of the vehicle, and/or the data concerning the position of the vehicle.

In some implementations, the video classification platform can send the message to a client device. In some implementations, the video classification platform can send the message to the client device to permit the client device to display the message at the client device. In some implementations, the video classification platform can send the message to the client device to permit the client device to display the category, the video data, the data concerning the acceleration/deceleration of the vehicle, and/or the data concerning the position of the vehicle at the client device.

Figure 1F:
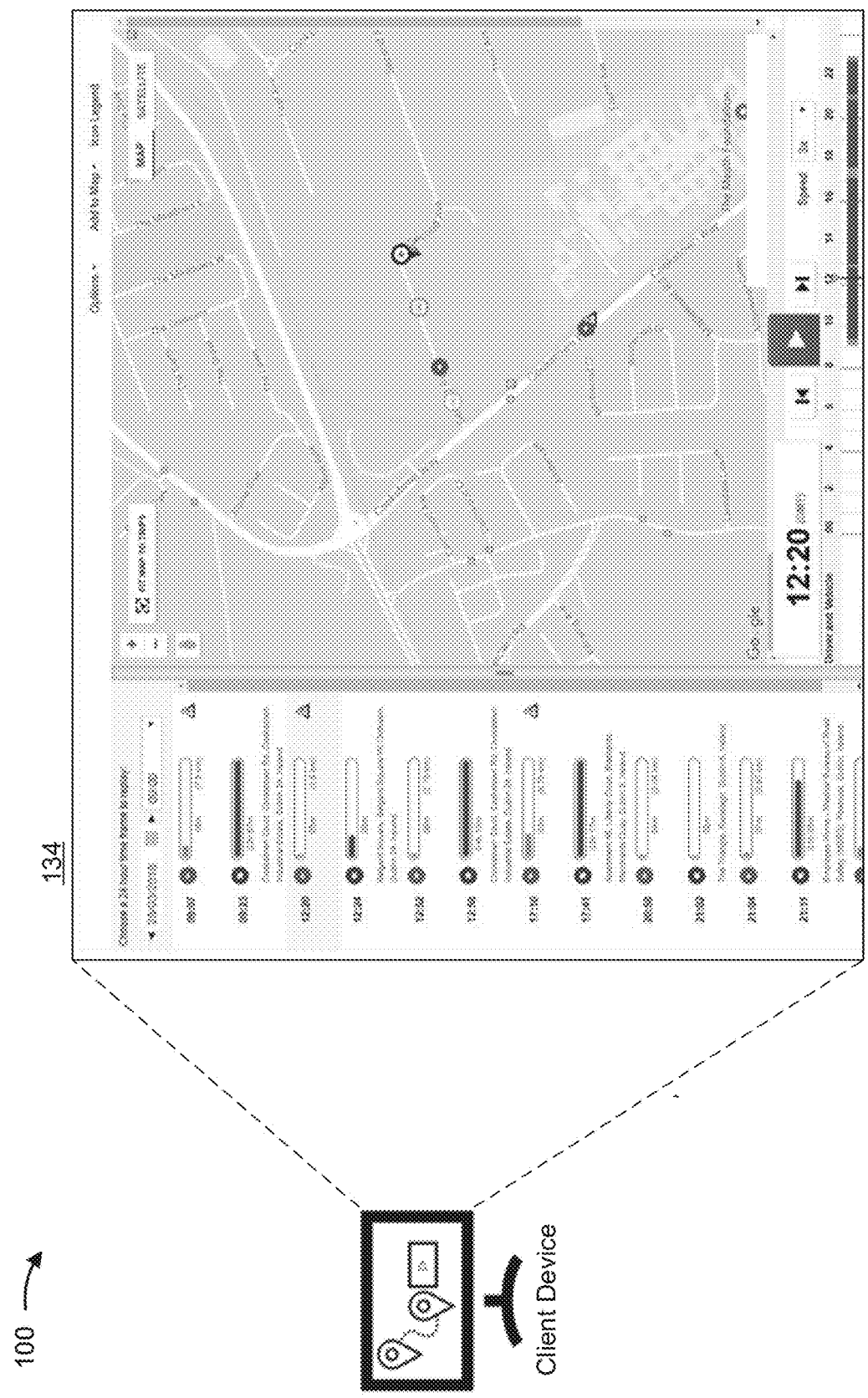

For example, as shown in FIG. 1F and by reference number 134, the video classification platform can send the message to the client device to permit the client device to display, via a user interface of the display, an icon on a map that indicates a harsh driving event, a category of the harsh driving event, and/or a location of the vehicle associated with the harsh driving event. In some implementations, the user interface can display a menu that includes information regarding trips made by the vehicle. In some implementations, a user can select a trip and the user interface can display a map that shows the route associated with the trip and one or more icons that indicate one or more harsh driving events. In some implementations, for an icon of the one or more icons, a color of the icon can indicate a category of the associated harsh driving event (e.g., an orange icon indicates a dangerous harsh driving event, a blue icon indicates a non-dangerous harsh driving event, and/or the like).

Figure 1G:
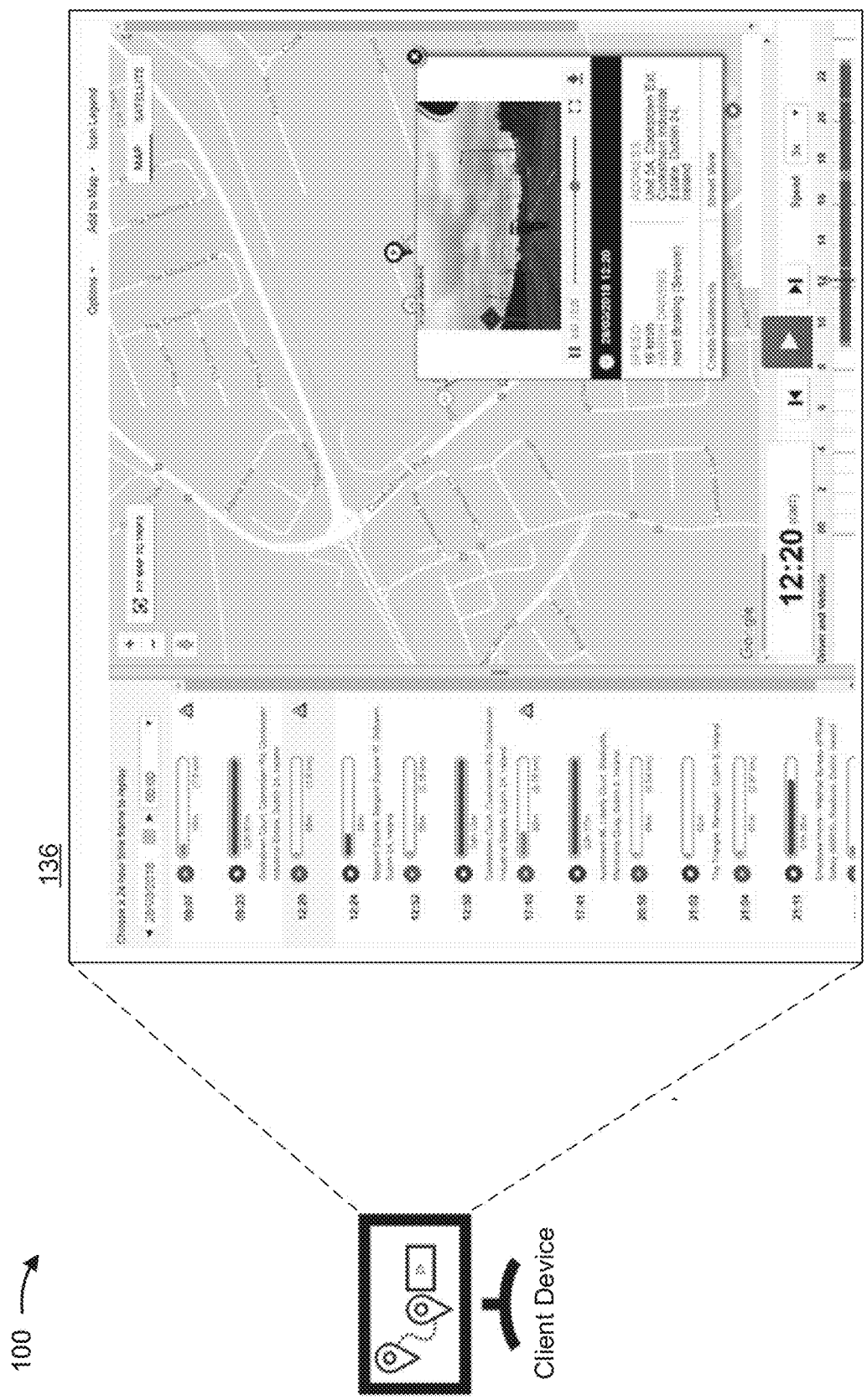

In some implementations, the user can select the icon for the harsh driving event and the user interface can display the category, the video data, the data concerning the acceleration/deceleration of the vehicle, and/or the data concerning the position of the vehicle. For example, as shown in FIG. 1G and by reference number 136, for a harsh driving event, the user interface can display the video data concerning the harsh driving event, the time and date of the harsh driving event, the speed of the vehicle at the time of the harsh driving event, the category of the harsh driving event, and the location of the vehicle at the time of the harsh driving event.

In some implementations, the client device can receive the message from the video classification platform that includes the category, the video data, the data concerning the acceleration/deceleration of the vehicle, and/or the data concerning the position of the vehicle. In some implementations, the client device can also receive additional data concerning the position of the vehicle and/or additional data concerning the acceleration/deceleration of the vehicle from the harsh driving event collection device. For example, where the harsh driving event collection device comprises a mobile user device and a vehicle tracking unit device, the mobile user device and the vehicle tracking unit device can include a GPS sensor and an accelerometer, respectively. The mobile user device can collect data concerning a position of a vehicle and data concerning an acceleration/deceleration of the vehicle (e.g., first telemetry information) and the vehicle tracking unit device can collect additional data concerning the position of the vehicle and additional data concerning the acceleration/deceleration of the vehicle (e.g., second telemetry information). The mobile user device can send the first telemetry information to the video classification platform (e.g., as described herein in regard to FIG. 1C and reference number 114) and the vehicle tracking unit device can send the second telemetry information to the client device (e.g., as described herein in regard to FIG. 1C and reference number 112). In this way, the video classification platform can use the first telemetry information to classify an associated harsh driving event and the client device can use the second telemetry information to track the position of the vehicle in real time.

In some implementations, due to the nature of collecting data using two different devices, the first telemetry information and the second telemetry information can be out-of-sync, mismatched, and/or the like. In some implementations, the client device can match the first telemetry information included in the message received from the video classification device and the second telemetry information received from the vehicle tracking unit device. In some implementations, the client device can match the first telemetry information and the second telemetry information by using a formula based on the start time of the harsh driving event, location of the vehicle during the harsh driving event, and/or the acceleration rate of the vehicle during the harsh driving event. For example, the client device can use the following formula:

$$f(\alpha,\beta,\gamma)=\alpha*t+\beta*d+\gamma*a$$

where:
t is the absolute value of the time difference between the start time of the harsh driving event as indicated by the first telemetry information (fti) and the second telemetry information (sti), $t=|t_{fti}-t_{sti}|$.
d is the absolute value of the great-circle distance between the location of the harsh driving event as indicated by the first telemetry information and the second telemetry information, $d=|d_{fti}-d_{sti}|$ (e.g., using the Haversine formula based on the mean radius of the Earth (6,371 km)).
a is the absolute value of the acceleration difference between the time of the harsh driving event as indicated by the first telemetry information and the second telemetry information, $a=|a_{fti}-a_{sti}|$.
α, β, γ are parameters that can be set based on technical experiments.

In this way, the client device can match the first telemetry information and the second information to display real time tracking information of the vehicle and information concerning the harsh driving event at the client device without displaying duplicative and/or incongruous information.

As indicated above, FIGS. 1A-1G are provided merely as examples. Other examples are possible and can differ from what was described with regard to FIGS. 1A-1G.

Figure 2:
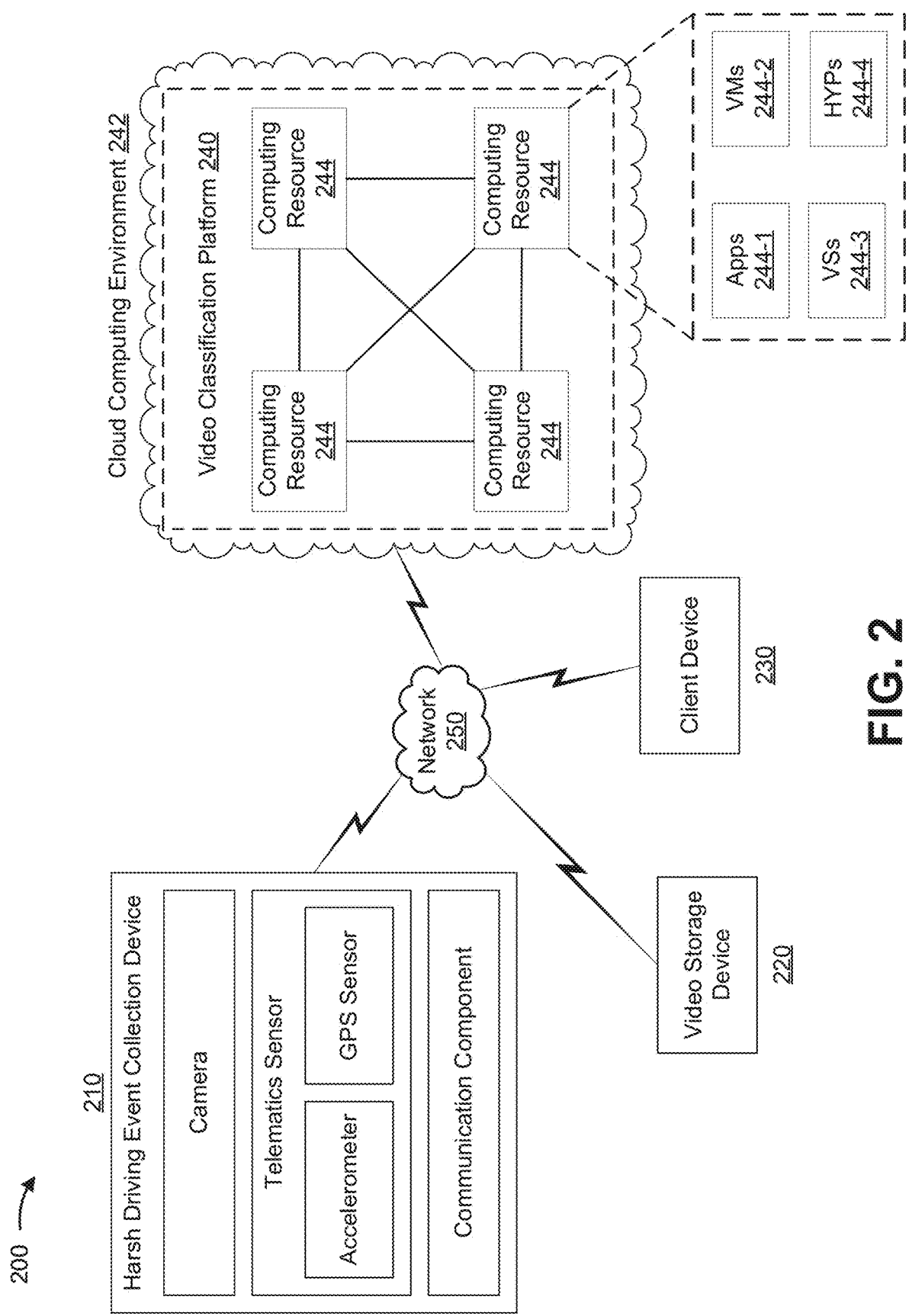
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a harsh driving event collection device 210, a video storage device 220, a client device 230, a video classification platform 240, a cloud computing environment 242, one or more computing resources 244, and network 250. Devices of environment 200 can interconnect via wired connections, wireless connections, or a combination of wired and wireless connections.

Harsh driving event collection device 210 includes one or more devices capable of receiving, generating, storing, processing, and/or providing information associated with automatic collection of information concerning harsh driving events. For example, harsh driving event collection device 210 can include a camera, a telemetry device such as a telematics sensor, and/or a communication component (e.g., a mobile phone device, a wireless communication device, and/or the like). In some implementations, the camera can include a dashboard camera, a video camera, and/or the like, and can capture and collect video data concerning the vehicle, the trajectory of the vehicle, a road that the vehicle is traveling on, one or more objects on and/or near the road, and/or the like. In some implementations, the telematics sensor can include an accelerometer that collects data concerning acceleration/deceleration of the vehicle, and/or can include a global positioning system (GPS) sensor that collects data concerning a position of the vehicle. In some implementations, the communication component can facilitate communication between harsh driving event collection device 210 and the one or more other devices, such as video storage device 220, client device 230, and/or video classification platform 24, via network 250.

Video storage device 220 includes one or more devices capable of receiving, generating, storing, processing, and/or providing video data associated with automatic collection of harsh driving events. For example, video storage device 220 can include a computing device, a server device, a data center device, or other device capable of receiving video data from harsh driving event collection device 210, storing the video data, and/or hosting the video data for download by video classification platform 240 and/or client device 230.

Client device 230 includes one or more devices capable of receiving, generating, storing, processing, and/or providing information associated with automatic collection and classification of harsh driving events. For example, client device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 230 can display information concerning a harsh driving event, a category of the harsh driving event, video data concerning the harsh driving event, data concerning acceleration/deceleration of a vehicle, and/or data concerning a position of the vehicle.

Video classification platform 240 includes one or more devices capable of receiving, generating, storing, processing, and/or providing information associated with classification of harsh driving events, such as information concerning harsh driving events automatically collected by harsh driving event collection device 210. For example, video classification platform 240 can include a server device (e.g., a host server, a web server, an application server, etc.), a data center device, or a similar device. In some implementations, as shown, video classification platform 240 can be hosted in cloud computing environment 242. Notably, while implementations described herein describe video classification platform 240 as being hosted in cloud computing environment 242, in some implementations, video classification platform 240 might not be cloud-based (i.e., can be implemented outside of a cloud computing environment 242) or might be partially cloud-based.

Cloud computing environment 242 includes an environment that delivers computing as a service, whereby shared resources, services, etc. can be provided to harsh driving event collection device 210, video storage device 220, client device 230, and/or video classification platform 240. Cloud computing environment 242 can provide computation, software, data access, storage, and/or other services that do not require end-user knowledge of a physical location and configuration of a system and/or a device that delivers the services. As shown, cloud computing environment 242 can include video classification platform 240 and computing resource(s) 244.

Computing resource 244 includes one or more personal computers, workstation computers, server devices, or another type of computation and/or communication device. In some implementations, computing resource 244 can host video classification platform 240. The cloud resources can include compute instances executing in computing resource 244, storage devices provided in computing resource 244, data transfer devices provided by computing resource 244, etc. In some implementations, computing resource 244 can communicate with other computing resources 244 via wired connections, wireless connections, or a combination of wired and wireless connections.

As further shown in FIG. 2, computing resource 244 can include a group of cloud resources, such as one or more applications ("APPs") 244-1, one or more virtual machines ("VMs") 244-2, virtualized storage ("VSs") 244-3, one or more hypervisors ("HYPs") 244-4, or the like.

Application 244-1 includes one or more software applications that can be provided to or accessed by one or more devices, such as harsh driving event collection device 210, video storage device 220, client device 230, and/or video classification platform 240. Application 244-1 can eliminate a need to install and execute the software applications on devices, such as harsh driving event collection device 210, video storage device 220, client device 230, and/or video classification platform 240. For example, application 244-1 can include software associated with video classification platform 240 and/or any other software capable of being provided via cloud computing environment 242. In some implementations, one application 244-1 can send/receive information to/from one or more other applications 244-1, via virtual machine 244-2.

Virtual machine 244-2 includes a software implementation of a machine (e.g., a computer) that executes programs like a physical machine. Virtual machine 244-2 can be either a system virtual machine or a process virtual machine, depending upon use and degree of correspondence to any real machine by virtual machine 244-2. A system virtual machine can provide a complete system platform that supports execution of a complete operating system ("OS"). A process virtual machine can execute a single program, and can support a single process. In some implementations, virtual machine 244-2 can execute on behalf of a user (e.g., client device 230), and can manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 244-4 provides hardware virtualization techniques that allow multiple operating systems (e.g., "guest operating systems") to execute concurrently on a host computer, such as computing resource 244. Hypervisor 244-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
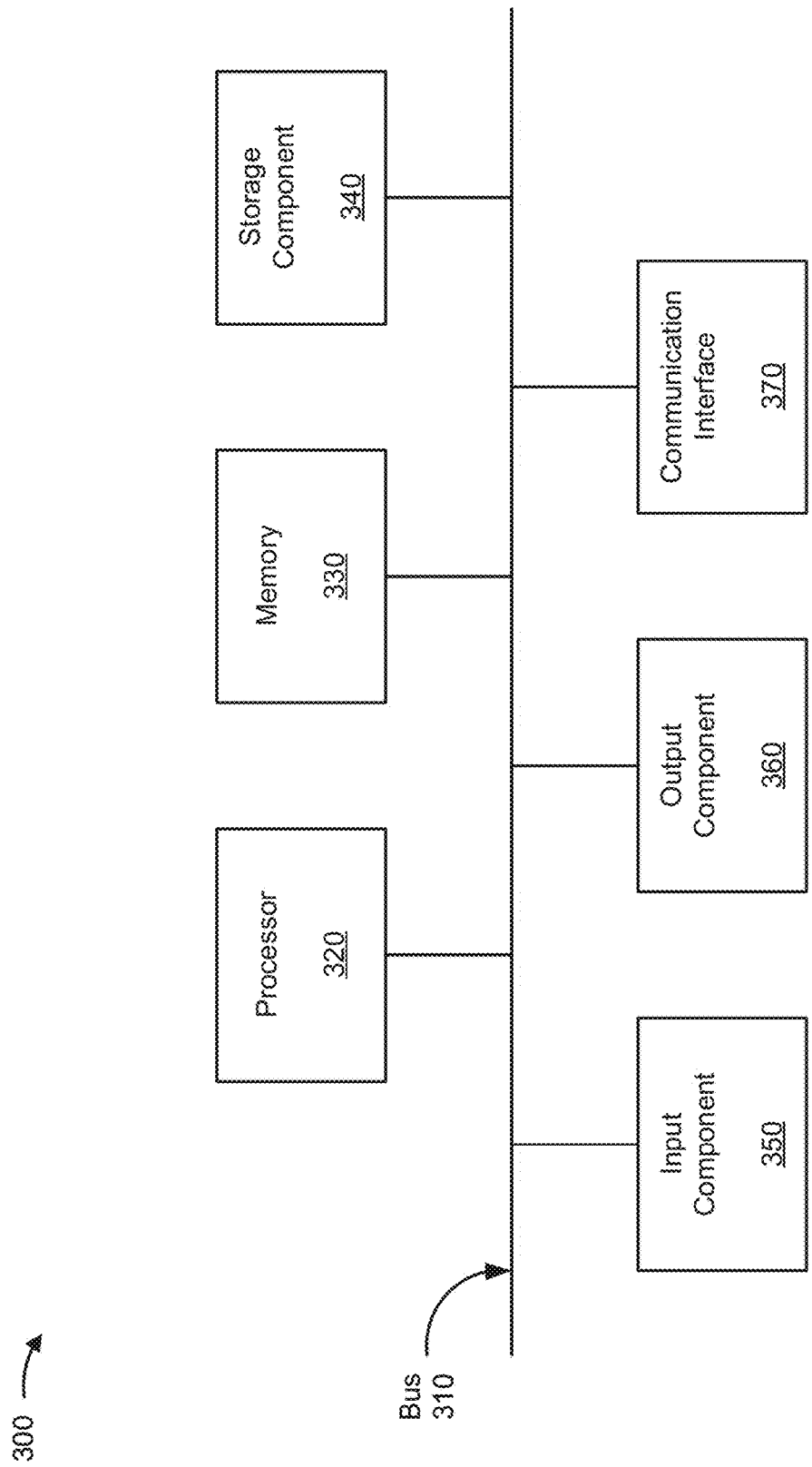
FIG. 3 is a diagram of example components of one or more devices of FIG. 2.

FIG. 3 is a diagram of example components of a device 300. Device 300 can correspond to harsh driving event collection device 210, video storage device 220, client device 230, and/or video classification platform 240. In some implementations, harsh driving event collection device 210, video storage device 220, client device 230, and/or video classification platform 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
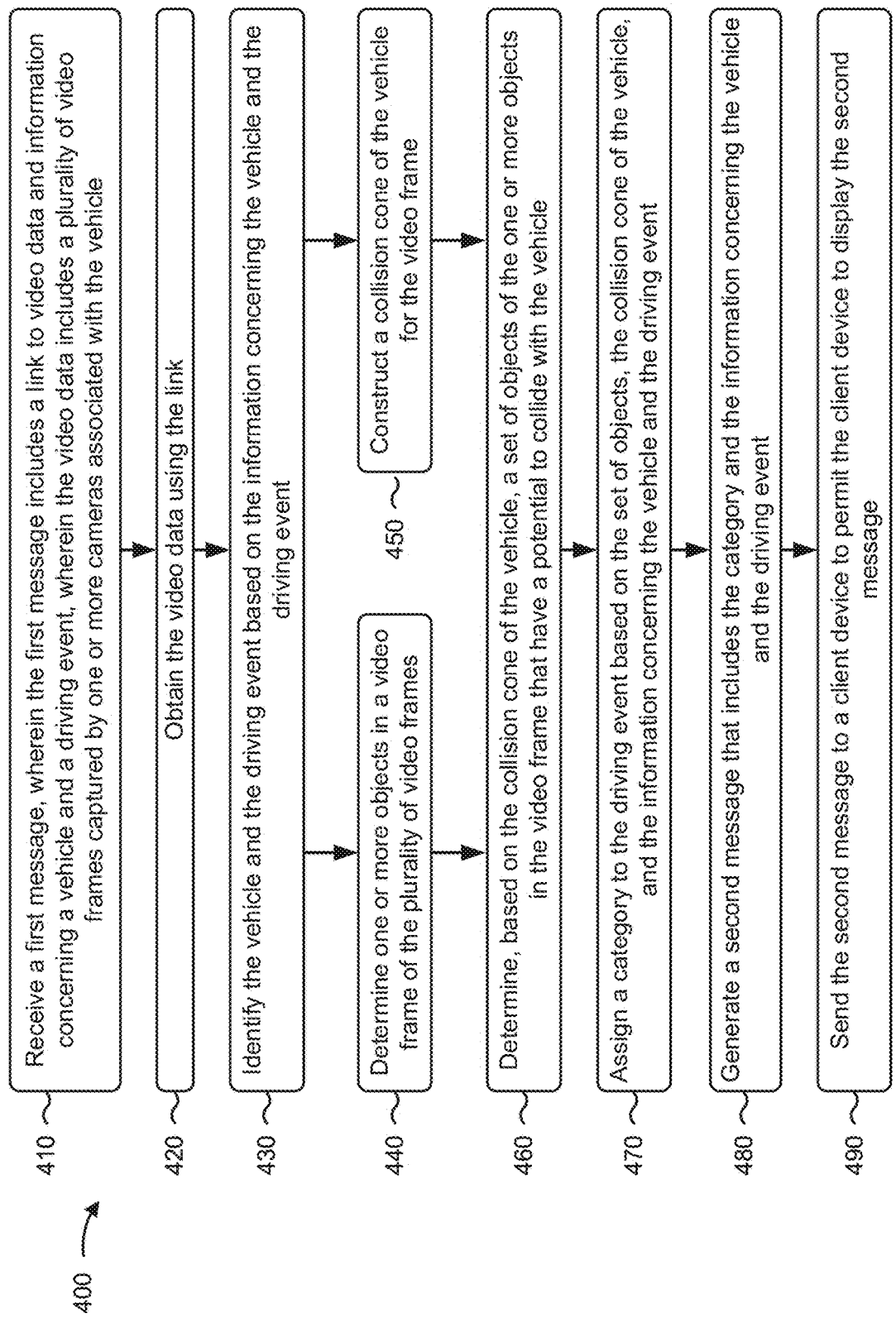
FIG. 4 is a flow chart of an example process for automatic collection and classification of harsh driving events in dashcam videos.

FIG. 4 is a flow chart of an example process 400 for automatic collection and classification of harsh driving events in dashcam videos. In some implementations, one or more process blocks of FIG. 4 can be performed by a video classification platform (e.g., video classification platform 240). In some implementations, one or more process blocks of FIG. 4 can be performed by another device or a group of devices separate from or including the video classification platform, such as harsh driving event collection device 210, video storage device 220, and/or client device 230.

As shown in FIG. 4, process 400 can include receiving a first message, wherein the first message includes a link to video data and information concerning a vehicle and a driving event, and wherein the video data includes a plurality of video frames captured by one or more cameras associated with the vehicle (block 410). For example, the video classification platform (e.g., using computing resource 244, processor 320, memory 330, storage component 340, input component 350, communication interface 370, and/or the like) can receive a first message, as described above in connection with FIGS. 1A-1G. In some implementations, the first message can include a link to video data and information concerning a vehicle and a driving event. In some implementations, the video data can include a plurality of video frames captured by one or more cameras associated with the vehicle.

As further shown in FIG. 4, process 400 can include obtaining the video data using the link (block 420). For example, the video classification platform (e.g., using computing resource 244, processor 320, memory 330, storage component 340, input component 350, output component 360, communication interface 370, and/or the like) can obtain the video data using the link, as described above in connection with FIGS. 1A-1G.

As further shown in FIG. 4, process 400 can include identifying the vehicle and the driving event based on the information concerning the vehicle and the driving event (block 430). For example, the video classification platform (e.g., using computing resource 244, processor 320, memory 330, storage component 340, and/or the like) can identify the vehicle and the driving event based on the information concerning the vehicle and the driving event, as described above in connection with FIGS. 1A-1G.

As further shown in FIG. 4, process 400 can include determining one or more objects in a video frame of the plurality of video frames (block 440). For example, the video classification platform (e.g., using computing resource 244, processor 320, memory 330, storage component 340, and/or the like) can determine one or more objects in a video frame of the plurality of video frames, as described above in connection with FIGS. 1A-1G.

As further shown in FIG. 4, process 400 can include constructing a collision cone of the vehicle for the video frame (block 450). For example, the video classification platform (e.g., using computing resource 244, processor 320, memory 330, storage component 340, and/or the like) can construct a collision cone of the vehicle for the video frame, as described above in connection with FIGS. 1A-1G.

As further shown in FIG. 4, process 400 can include determining, based on the collision cone of the vehicle, a set of objects of the one or more objects in the video frame that have a potential to collide with the vehicle (block 460). For example, the video classification platform (e.g., using computing resource 244, processor 320, memory 330, storage component 340, and/or the like) can determine, based on the collision cone of the vehicle, a set of objects of the one or more objects in the video frame that have a potential to collide with the vehicle, as described above in connection with FIGS. 1A-1G.

As further shown in FIG. 4, process 400 can include assigning a category to the driving event based on the set of objects, the collision cone of the vehicle, and the information concerning the vehicle and the driving event (block 470). For example, the video classification platform (e.g., using computing resource 244, processor 320, memory 330, storage component 340, and/or the like) can assign a category to the driving event based on the set of objects, the collision cone of the vehicle, and the information concerning the vehicle and the driving event, as described above in connection with FIGS. 1A-1G.

As further shown in FIG. 4, process 400 can include generating a second message that includes the category and the information concerning the vehicle and the driving event (block 480). For example, the video classification platform (e.g., using computing resource 244, processor 320, memory 330, storage component 340, output component 360, communication interface 370, and/or the like) can generate a second message that includes the category and the information concerning the vehicle and the driving event, as described above in connection with FIGS. 1A-1G.

As further shown in FIG. 4, process 400 can include sending the second message to a client device to permit the client device to display the second message (block 490). For example, the video classification platform (e.g., using computing resource 244, processor 320, memory 330, storage component 340, output component 360, communication interface 370, and/or the like) can send the second message to a client device to permit the client device to display the second message, as described above in connection with FIGS. 1A-1G.

Process 400 can include additional implementations, such as any single implementation or any combination of implementations described below and/or in connection with one or more other processes described elsewhere herein.

In some implementations, when determining the one or more objects in the video frame of the plurality of video frames, the video classification platform can process the video frame using an object detection algorithm, such as an object detection algorithm that employs a convolutional neural network. In some implementations, when constructing the collision cone of the vehicle for the video frame, the video classification platform can compute an optical flow of the video frame, determine a vanishing point of the video frame, and construct the collision cone of the vehicle for the video frame based on the optical flow and the vanishing point.

In some implementations, when determining, based on the collision cone of the vehicle, the set of objects of the one or more objects in the video frame that have the potential to collide with the vehicle, the video classification platform can determine motion of the one or more objects, calculate a time to collision of the one or more objects based on the collision cone, and determine the set of objects based on the motion of the one or more objects and the time to collision of the one or more objects.

In some implementations, when assigning the category to the driving event based on the set of objects, the collision cone of the vehicle, and the information concerning the vehicle and the driving event, the video classification platform can process information regarding the set of objects, information regarding the collision cone of the vehicle, and the information concerning the vehicle and the driving event using a vehicle event categorization algorithm, such as a machine learning algorithm. In some implementations, the category can indicate a level of severity of the driving event. In some implementations, the category can be based on a duration of the driving event, an acceleration or deceleration rate of the vehicle, a speed of the vehicle, and a trigger of the driving event.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, provide a harsh driving event collection device 210 that is capable of collecting video data concerning a harsh driving event and a video classification platform 240 that is capable of classifying the harsh driving event by processing the video data concerning the harsh driving event. In some implementations, harsh driving event collection device 210 can include a camera that stores video data files in a circular buffer, such that the camera can collect video data for a period of time concerning the harsh driving event that includes a first interval of time before the harsh driving event and a second interval of time after the harsh driving event. In some implementations, harsh driving event collection device 210 can collect data concerning acceleration/deceleration of a vehicle and data concerning a position of the vehicle. In some implementations, video classification platform 240 can process the video data, the data concerning acceleration/deceleration of the vehicle, and the data concerning the position of the vehicle to determine features of the harsh driving event. In some implementations, video classification platform 240 can assign a category to the harsh driving event based on the features. In some implementations, video classification platform 240 can send a message to client device 230 so that that client device 230 can display information concerning the harsh driving event, the category, the video data, the data concerning acceleration/deceleration of the vehicle, and the data concerning the position of the vehicle.

In this way, implementations described herein can alert fleet managers and/or drivers of harsh driving events and/or provide tools for reviewing harsh driving events after they happen. In this way, implementations described herein provide drivers information that can be used to change the driving behavior of the drivers. Similarly, implementations described herein can allow fleet managers to create safe driving training materials and/or guidelines, which can prevent or reduce the quantity of harsh driving events in the future. This can result in the increased safety of the drivers, the vehicles the drivers operate, and other people and property. This can also result in less wear-and-tear on the vehicles or vehicle components, which can reduce costs associated with maintaining the vehicles.

Furthermore, implementations described herein are automated and can process numerous (e.g., hundreds, thousands, millions, billions, and/or the like) data points to classify numerous harsh driving events at the same time. This can improve speed and efficiency of the process and conserve computing resources (e.g., processor resources, memory resources, and/or the like) of harsh driving event collection device 210, the video classification platform, and/or client device 230. Furthermore, implementations described herein use a rigorous, computerized process to perform tasks or roles that were not previously performed or were previously performed using subjective human intuition or input. For example, currently there does not exist a technique to automatically collect information concerning a harsh driving event and/or process the information concerning the harsh driving event to classify the harsh driving event. Finally, implementations described herein conserve computing resources (e.g., processor resources, memory resources, and/or the like) that would otherwise be wasted in attempting to assist a human in collecting information concerning a harsh driving event and/or classifying the harsh driving event by hand (e.g. by searching a database for video data concerning a harsh driving event, reviewing the video data at a client device, and classifying the harsh driving event at the client device).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a first message,
      wherein the first message includes a link to video data and information concerning a vehicle and a driving event,
         wherein the video data includes a plurality of video frames captured by one or more cameras associated with the vehicle;
   obtaining, by the device, the video data using the link;
   identifying, by the device, the vehicle and the driving event based on the information concerning the vehicle and the driving event;
   determining, by the device, one or more objects in a video frame of the plurality of video frames;
   constructing, by the device, a collision cone of the vehicle for the video frame;
   determining, by the device and based on the collision cone of the vehicle, a set of objects of the one or more objects in the video frame that have a potential to collide with the vehicle;
   assigning, by the device, a category to the driving event based on the set of objects, the collision cone of the vehicle, and the information concerning the vehicle and the driving event;
   generating, by the device, a second message that includes the category and the information concerning the vehicle and the driving event; and
   sending, by the device, the second message to a client device to permit the client device to display the second message.

2. The method of claim 1, wherein determining the one or more objects in the video frame of the plurality of video frames comprises:
   processing the video frame using an object detection algorithm,
      wherein the object detection algorithm employs a convolutional neural network.

3. The method of claim 1, wherein constructing the collision cone of the vehicle for the video frame comprises:
   computing an optical flow of the video frame;
   determining a vanishing point of the video frame; and
   constructing the collision cone of the vehicle for the video frame based on the optical flow and the vanishing point.

4. The method of claim 1, wherein determining, based on the collision cone of the vehicle, the set of objects of the one or more objects in the video frame that have the potential to collide with the vehicle comprises:
   determining motion of the one or more objects;
   calculating a time to collision of the one or more objects based on the collision cone; and
   determining the set of objects based on the motion of the one or more objects and the time to collision of the one or more objects.

5. The method of claim 1, wherein assigning the category to the driving event based on the set of objects, the collision cone of the vehicle, and the information concerning the vehicle and the driving event comprises:
   processing information regarding the set of objects, information regarding the collision cone of the vehicle, and the information concerning the vehicle and the driving event using a vehicle event categorization algorithm,
      wherein the vehicle event categorization algorithm is a machine learning algorithm.

6. The method of claim 1, wherein the category indicates a level of severity of the driving event.

7. The method of claim 6, wherein the category is based on:
   a duration of the driving event;
   an acceleration or deceleration rate of the vehicle;
   a speed of the vehicle; and
   a trigger of the driving event.

8. A device, comprising:
   one or more memory devices; and
   one or more processors operatively coupled to the memory devices, the one or more processors to:
      receive a first message,
         wherein the first message includes a link to video data and information concerning a vehicle and a driving event,
            wherein the video data includes a plurality of video frames captured by one or more cameras associated with the vehicle;
      obtain the video data using the link;
      identify the vehicle and the driving event based on the information concerning the vehicle and the driving event;
      determine one or more objects in a video frame of the plurality of video frames;
      construct a collision cone of the vehicle for the video frame;
      determine, based on the collision cone of the vehicle, a set of objects of the one or more objects in the video frame that have a potential to collide with the vehicle;
      assign a category to the driving event based on the set of objects, the collision cone of the vehicle, and the information concerning the vehicle and the driving event;
      generate a second message that includes the category and the information concerning the vehicle and the driving event; and
      send the second message to a client device to permit the client device to display the second message.

9. The device of claim 8, wherein the one or more processors, when determining the one or more objects in the video frame of the plurality of video frames, are to:
   process the video frame using an object detection algorithm,
      wherein the object detection algorithm employs a convolutional neural network.

10. The device of claim 8, wherein the one or more processors, when constructing the collision cone of the vehicle for the video frame, are to:
    compute an optical flow of the video frame;
    determine a vanishing point of the video frame; and
    construct the collision cone of the vehicle for the video frame based on the optical flow and the vanishing point.

11. The device of claim 8, wherein the one or more processors, when determining, based on the collision cone of the vehicle, the set of objects of the one or more objects in the video frame that have the potential to collide with the vehicle, are to:

determine motion of the one or more objects;
calculate a time to collision of the one or more objects based on the collision cone; and
determine the set of objects based on the motion of the one or more objects and the time to collision of the one or more objects.

12. The device of claim 8, wherein the one or more processors, when assigning the category to the driving event based on the set of objects, the collision cone of the vehicle, and the information concerning the vehicle and the driving event, are to:
process information regarding the set of objects, information regarding the collision cone of the vehicle, and the information concerning the vehicle and the driving event using a vehicle event categorization algorithm,
wherein the vehicle event categorization algorithm is a machine learning algorithm.

13. The device of claim 8, wherein the category indicates a level of severity of the driving event.

14. The device of claim 13, wherein the category is based on:
a duration of the driving event;
an acceleration or deceleration rate of the vehicle;
a speed of the vehicle; and
a trigger of the driving event.

15. A non-transitory computer-readable medium storing instructions, the instructions comprising:
one or more instructions that, when executed by one or more processors, cause the one or more processors to:
receive, by a device, a first message,
wherein the first message includes a link to video data and information concerning a vehicle and a driving event,
wherein the video data includes a plurality of video frames captured by one or more cameras associated with the vehicle;
obtain the video data using the link;
identify the vehicle and the driving event based on the information concerning the vehicle and the driving event;
determine one or more objects in a video frame of the plurality of video frames;
construct a collision cone of the vehicle for the video frame;
determine, based on the collision cone of the vehicle, a set of objects of the one or more objects in the video frame that have a potential to collide with the vehicle;
assign a category to the driving event based on the set of objects, the collision cone of the vehicle, and the information concerning the vehicle and the driving event;
generate a second message that includes the category and the information concerning the vehicle and the driving event; and
send the second message to a client device to permit the client device to display the second message.

16. The non-transitory computer-readable medium of claim 15, wherein the one or more instructions, that cause the one or more processors to determine the one or more objects in the video frame of the plurality of video frames, cause the one or more processors to:
process the video frame using an object detection algorithm,
wherein the object detection algorithm employs a convolutional neural network.

17. The non-transitory computer-readable medium of claim 15, wherein the one or more instructions, that cause the one or more processors to construct the collision cone of the vehicle for the video frame, cause the one or more processors to:
compute an optical flow of the video frame;
determine a vanishing point of the video frame; and
construct the collision cone of the vehicle for the video frame based on the optical flow and the vanishing point.

18. The non-transitory computer-readable medium of claim 15, wherein the one or more instructions, that cause the one or more processors to determine, based on the collision cone of the vehicle, the set of objects of the one or more objects in the video frame that have the potential to collide with the vehicle, cause the one or more processors to:
determine motion of the one or more objects;
calculate a time to collision of the one or more objects based on the collision cone; and
determine the set of objects based on the motion of the one or more objects and the time to collision of the one or more objects.

19. The non-transitory computer-readable medium of claim 15, wherein the one or more instructions, that cause the one or more processors to assign the category to the driving event based on the set of objects, the collision cone of the vehicle, and the information concerning the vehicle and the driving event, cause the one or more processors to:
process information regarding the set of objects, information regarding the collision cone of the vehicle, and the information concerning the vehicle and the driving event using a vehicle event categorization algorithm,
wherein the vehicle event categorization algorithm is a machine learning algorithm.

20. The non-transitory computer-readable medium of claim 15, wherein the category is based on:
a duration of the driving event;
an acceleration or deceleration rate of the vehicle;
a speed of the vehicle; and
a trigger of the driving event.

* * * * *